United States Patent
Vos

[11] Patent Number: 5,666,876
[45] Date of Patent: Sep. 16, 1997

[54] COOKING APPARATUS

[75] Inventor: Peter Martin Vos, Malaga, Australia

[73] Assignee: Vos Industries Ltd., Malaga, Australia

[21] Appl. No.: 670,138

[22] Filed: Jun. 25, 1996

Related U.S. Application Data

[63] Continuation of Ser. No. 244,969, Oct. 7, 1994, abandoned.

[30] Foreign Application Priority Data

Dec. 20, 1991 [AU] Australia ................................. PL0127
Dec. 18, 1992 [WO] WIPO .................... PCT/AU92/00669

[51] Int. Cl.⁶ ............................ A23L 1/01; A47J 37/12
[52] U.S. Cl. ........................... 99/443 C; 99/404; 99/516
[58] Field of Search .................... 99/443 C, 516, 99/404, 407; 198/834, 835, 583

[56] References Cited

U.S. PATENT DOCUMENTS

| | | | |
|---|---|---|---|
| 2,572,325 | 10/1951 | Ernst | 198/835 |
| 2,710,683 | 6/1955 | McClenny, Jr. | 198/835 |
| 3,736,860 | 6/1973 | Vischer, Jr. | 99/443 C |
| 4,015,706 | 4/1977 | Goffredo et al. | 198/583 |
| 4,037,334 | 7/1977 | Plemitscher | 198/834 |
| 4,387,630 | 6/1983 | Timbers et al. | 99/576 |
| 4,857,279 | 8/1989 | Kawamata et al. | 99/516 |
| 4,942,810 | 7/1990 | Zittel et al. | 99/443 C |
| 4,947,741 | 8/1990 | Gongwer | 99/443 C |
| 5,066,505 | 11/1991 | Vos et al. | 426/438 |
| 5,189,948 | 3/1993 | Liebermann | 99/443 C |

*Primary Examiner*—Reginald Alexander
*Attorney, Agent, or Firm*—Westman, Champlin & Kelly, P.A.

[57] ABSTRACT

A cooking apparatus (10) comprising a cooking chamber with a conveyor (52) wholly contained therein wherein food (46) is cooked by sprays (22) of the cooking medium.

1 Claim, 5 Drawing Sheets

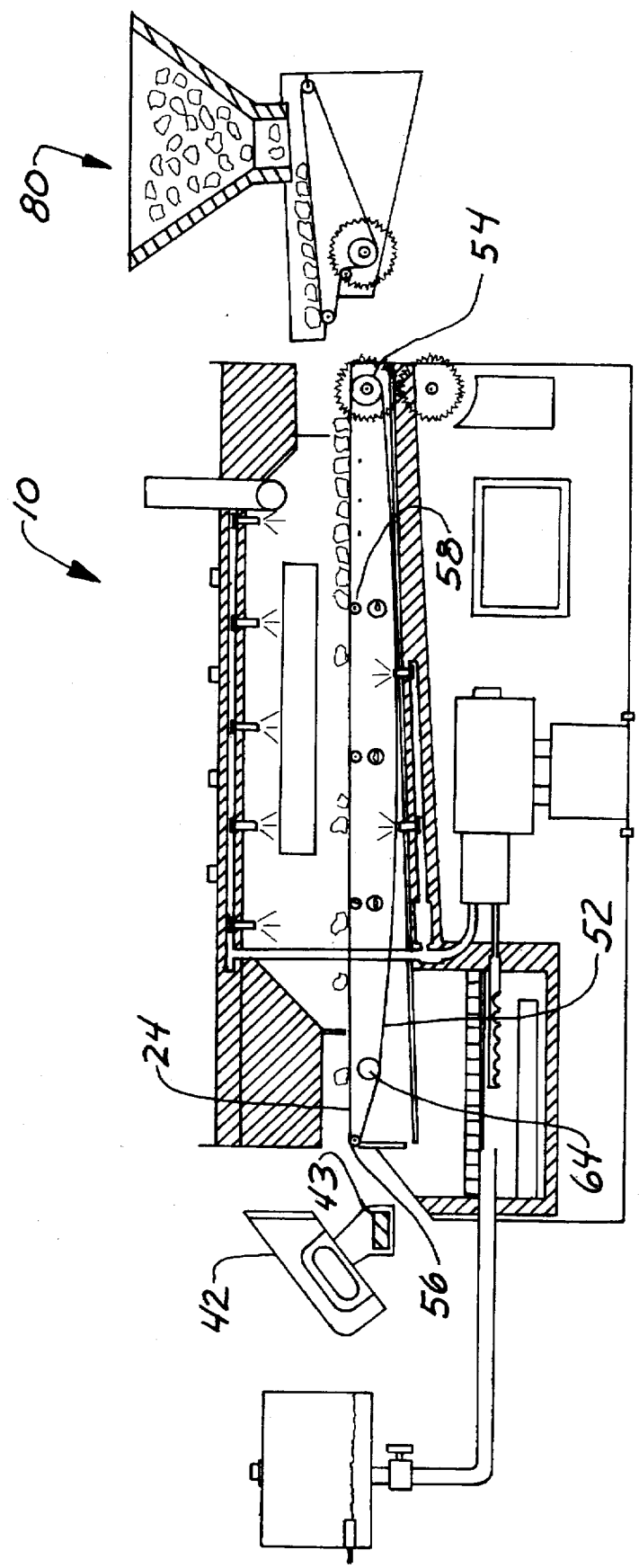

5,666,876

COOKING APPARATUS

This is a continuation of application Ser. No. 08/244,969, filed Oct. 7, 1994 now abandoned. Priority of the prior application is claimed pursuant to 35 USC § 120.

DESCRIPTION

The present invention relates to a cooking apparatus.

FIELD OF INVENTION

The apparatus of the present invention provides a significant alternative to conventional apparatus. The apparatus of the present invention may replace convention immersion type cooking apparatus in which food items to be cooked are placed in a bath, vat or other container containing cooking fluid. A wide range of foods are cooked in such immersion type cooking apparatus and the cooking fluids often used are oil or water. The cooking apparatus of the present invention is arranged such that it may spray or shower food items to be cooked with cooking fluid to thereby effect cooking thereof. The cooking apparatus has been designed to convey food on a conveyor belt thus providing a continuous feed and automated system of cooking. The conveyor belt of the said cooking apparatus is enclosed entirely in the cooking chamber resulting in substantial benefits including the maintenance of heat within the cooking chamber, easy cleaning of the conveyor by enabling it to be simply removed and by maintaining the conveyor within the chamber no oil is carried outside of the cooking chamber and thereby lost and or cooled.

SUMMARY OF THE INVENTION

In accordance with one aspect of the present invention there is providing a cooking apparatus comprising:

A housing having an inlet end, a outlet end and a cooking chamber therebetween;

conveyor means to conveyor food to be cooked;

spray means to spray said food with cooking fluid in said cooking chamber;

wherein said conveyor means is arranged to convey said food through said cooking chamber such that said food is contacted by said cooking fluid and cooked and said conveyor means is positioned wholly within said housing.

BRIEF DESCRIPTION OF THE DRAWINGS

FIG. 5 is a side view of a cooking apparatus in accordance with the present invention similar to FIG. 2 but showing an alternative embodiment of a conveyor for the cooking apparatus shown in FIG. 1.

DESCRIPTION OF THE INVENTION

Figure 1:
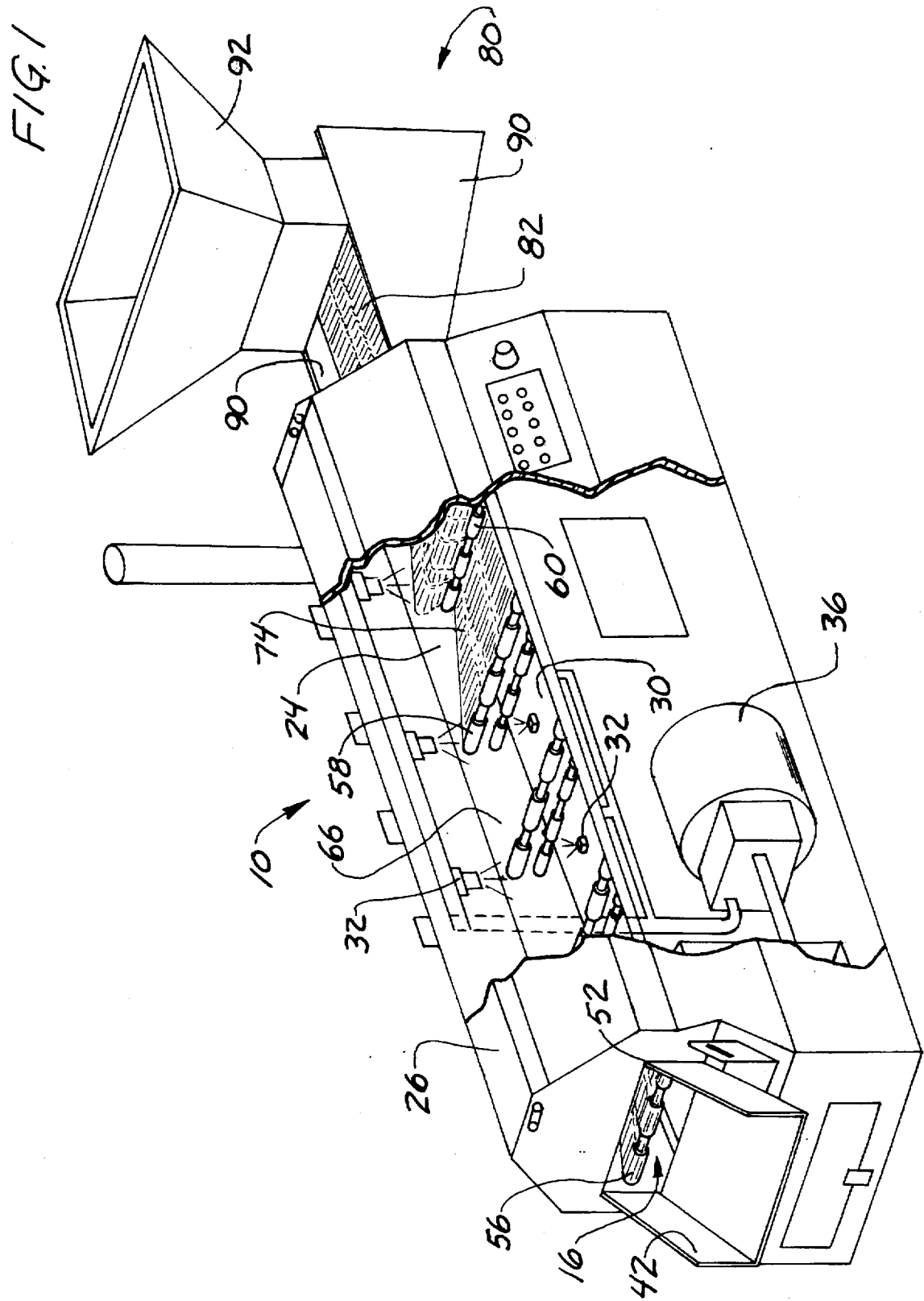
FIG. 1 is a perspective view of an embodiment of a cooking apparatus in accordance with the present invention.
Figure 2:
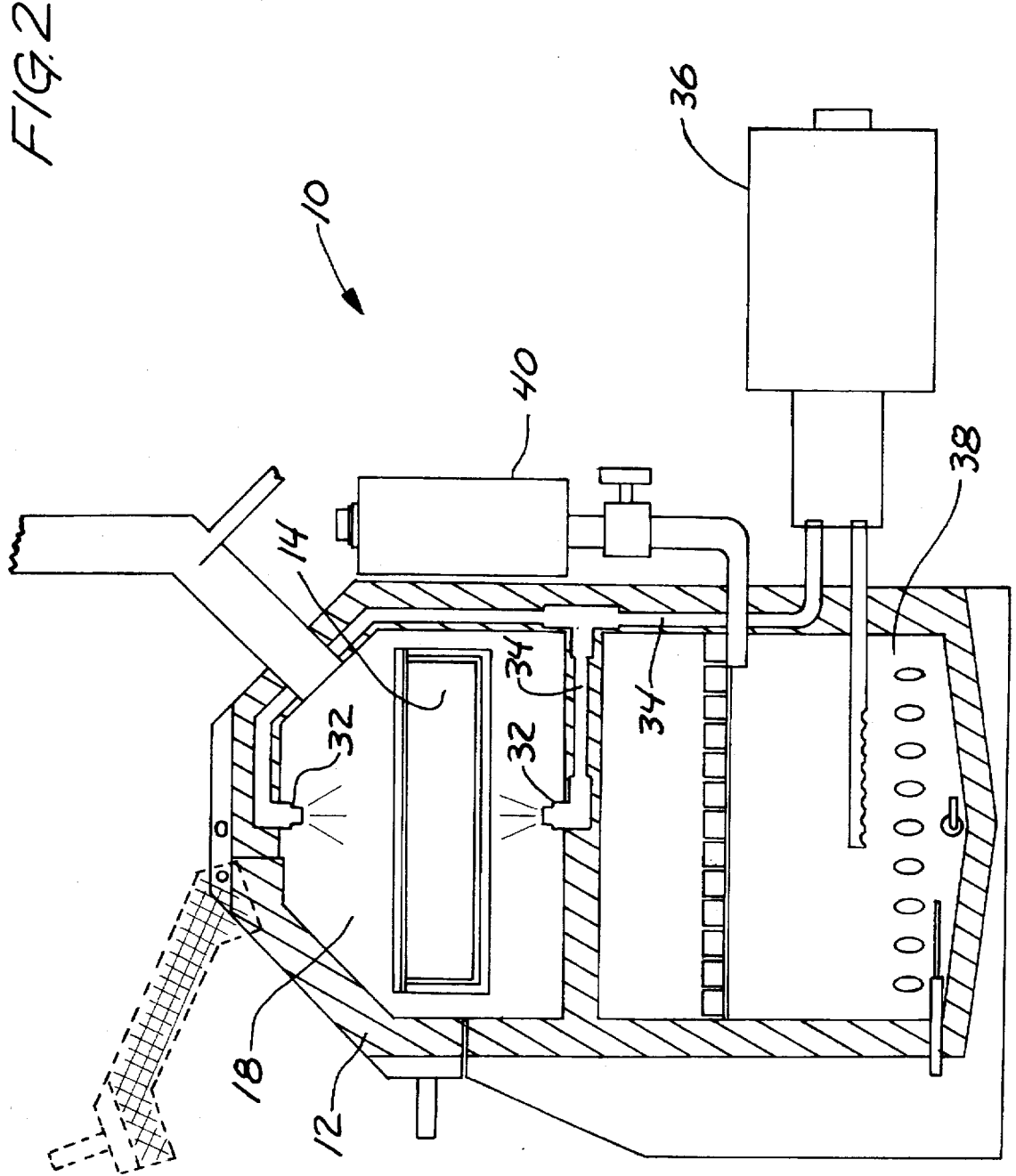
FIG. 2 is an end view of the cooking apparatus shown in FIG. 1.

The following description is given by way of example only in embodiments of the cooking apparatus. In the drawings there is shown a cooking apparatus 10 comprising a housing 12 having an inlet end 14 and an outlet end 16 with a cooking chamber 18 therebetween, spray assemblies 20 and 22 and a conveyor 24.

Figure 3:
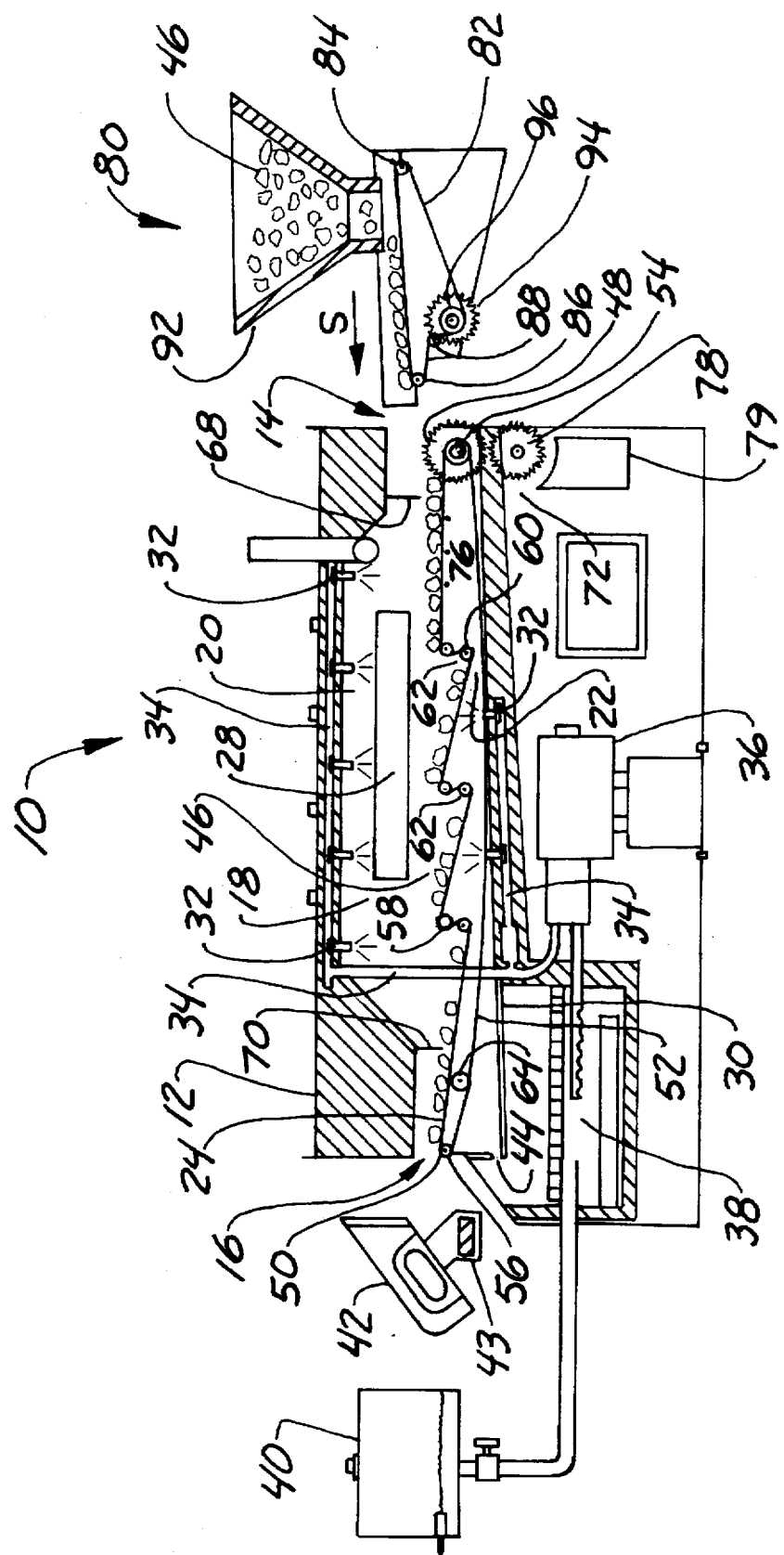
FIG. 3 is a first side view of the cooking apparatus shown in FIG. 1.

The housing 12 has an openable cover 28 which is hingedly connected to the remainder of the housing 12 at the rear thereof (obscured in FIG. 1). A window 28 may be provided in the cover 26 at the front of the housing 12 as is best seen in FIG. 3.

A sloped lower surface 30 of the housing 12 is located at the bottom of the cooking chamber 18. The sloped lower surface 30 slopes downwardly in the direction from the inlet end 14 to the outlet end 16.

The spray assemblies 20 and 22 are arranged to spray cooking fluid into the cooking chamber 18.

The spray assembly 20 sprays cooking fluid into the cooking chamber 18 from the upper part thereof and the spray assembly 22 sprays cooking fluid into the cooking chamber 18 from the lower part thereof.

If desired, only the spray assembly 20 may be operated or provided.

The spray asssemblies 20 and 22 comprise spray nozzles 32 and pipes 34 connected thereto to supply the cooking fluid to the nozzles 32. The pipes 34 are connected to a pump and motor assembly shown generally at 36.

The pump and motor assembly 36 is connected to a reservoir or collector/heating arrangement shown generally at 38. However, the details of these components do not form part of the present invention and reference thereto is made simply to enable the operation of the cooking apparatus to be described.

A tank 40, containing the cooking fluid medium may be provided to feed cooking fluid to a reservoir or collector which forms part of the reservoir or collector/heating arrangement 38.

A discharge chute 42 may be provided adjacent the outlet end 18. The discharge chute 42 is removable and is shown in position in FIG. 4.

The housing 12 is provided with an opening 44 such that the cooking fluid, after being sprayed from the nozzles 32, can flow along the sloped lower surface 30 through the opening 44 and into the reservoir or collector after first passing through a (removable) filter 43 which extends from the discharge chute 42 into the reservoir or collector.

The opening 44 is positioned at the downstream end of the housing 12 (at the end of the outlet 18) and beneath the conveyor 24.

The conveyor 24 is positioned in the housing 12 such that food items 46 to be cooked may be conveyed through the cooking chamber 18. In doing so, the food items 46 are contacted by the cooking fluid being sprayed from the nozzles 32. In this way the food items 46 are cooked. The conveyor 24 is positioned wholly within the housing 12 such that it is positioned intermediate the inlet 14 and the outlet 16.

The conveyor 24 shown in the drawings has a first end 48 positioned at the inlet end 14 and a second end 50 positioned at the outlet end 16.

The conveyor 24 comprises a conveyor belt 52 which passes around a pair of end rollers 54 and 56. The conveyor 24 further comprises guide rollers 58 and tensioning rollers 60. The conveyor belt 52 passes over and around successive pairs of guide rollers 58 and tensioning rollers 60 to create dips 62 in the path of the conveyor belt 52. However, if desired the dips 62 may be omitted. A wiper roller 64 may be provided to wipe excess cooking fluid from the conveyor belt 52. The wiper roller 64 is located near the second end 50 of the conveyor 24.

The end rollers 54 and 56, guide rollers 58, tensioning rollers 60 and wiper rollers 64 are held on spindles which are rotatably held between two longitudinal side members 66 of the conveyor 24. One of these longitudinal side members 66 can be seen in FIG. 1, the other has been removed for clarity.

The conveyor belt 52 may comprise a wire grid-like mesh as best seen in FIG. 1. This wire grid-like mesh enables the conveyor belt 52 to pass over and around the end rollers 54 and 56, guide rollers 58, tensioning rollers 60 and the wiper roller 64.

Figure 4:
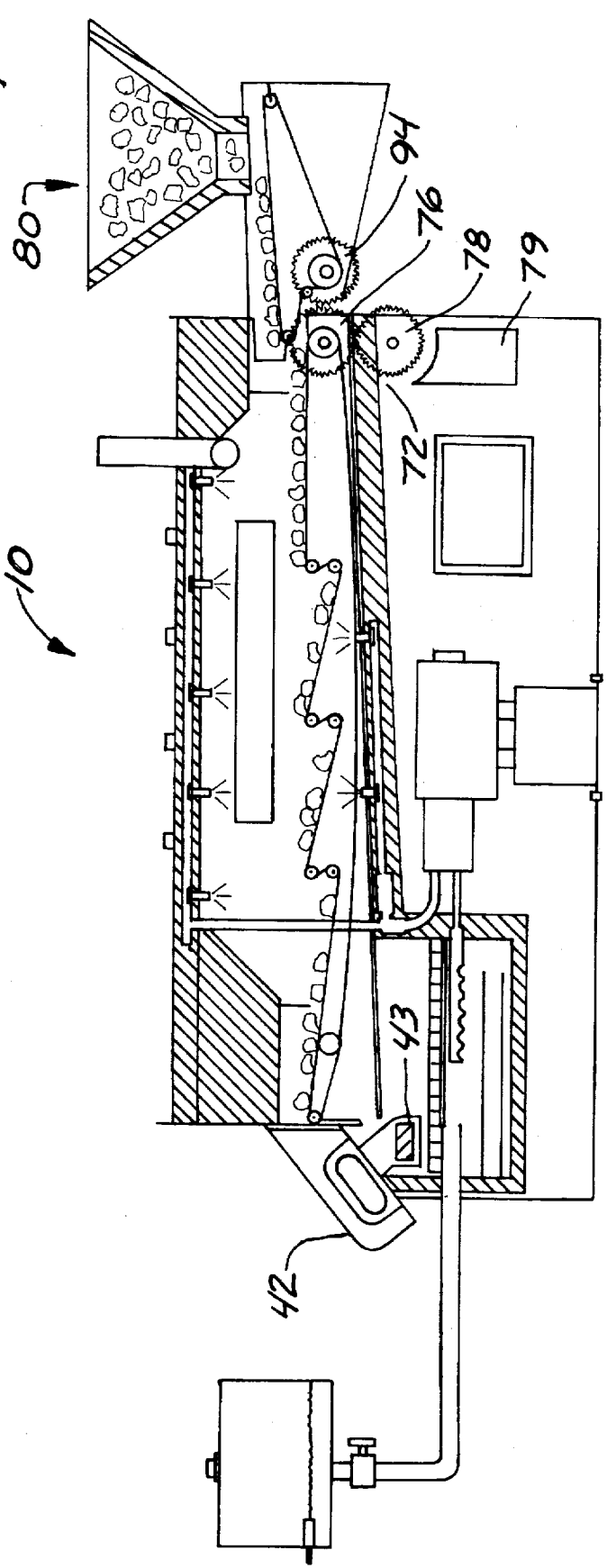
FIG. 4 is a second side view of the cooking apparatus shown in FIG. 1.
Figure 4A:
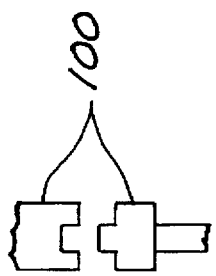
FIG. 4A is an exploded view of the male and female drive coupling joining the spindle of the conveyor to the drive mechanism.

Whilst the conveyor 24 shown in FIGS. 1, 3 and 4 has dips 62 provided in the conveyor belt 52, a conveyor of other structure may be used.

Accordingly, FIG. 5 shows a cooking apparatus 10' comprising a conveyor 24' in which the conveyor belt 52' passes around end rollers 54 and 56 and has a flat travel surface without any dips 62.

In other respects, the cooking apparatus 10' and conveyor 24' are like the cooking apparatus 10 and conveyor 24 respectively, and will not be further herein described. Accordingly, the other reference numerals have been omitted from FIG. 5.

The appropriate conveyor can be used depending upon the type of food being cooked.

Returning to the description with reference to FIGS. 1 to 4, flaps 68 and 70 are positioned between the inlet end 14 and the outlet end 16, respectively, to close off the cooking chamber 18.

The cooking apparatus 10 further comprises a drive assembly, shown generally at 72. The drive assembly provides drive to the conveyor 24 so that the conveyor belt 52 moves over the rollers 54, 56, 58 and 60 so that the upper track 74 of the conveyor belt 52 (upon which the food items 46 rest) moves in the direction from the inlet 14 to the outlet 16. The drive assembly 72 may comprise a pair of toothed wheels 76 and 78. The toothed wheels 76 and 78 mesh. This is best seen in FIG. 3. The toothed wheel 76 is connected by a drive shaft to the spindle of the end roller 54 by a male and female drive coupling 100 which enables the conveyor 10 to be easily removed from the cooking chamber 18. The toothed wheels 78 are held in the housing 12 and driven by a motor 79. When this motor 79 is activated drive is transferred from the toothed wheels 78 to the toothed wheels 76 through the male and female drive coupling 100 and spindle end roller 54 to move the conveyor belt 52.

The food items 46 to be cooked may be loaded onto the conveyor belt 52 at the inlet end 14 in any suitable manner. This may be by way of a loading chute (not shown). This loading chute may be positioned at a downwardly inclined angle with its lower end at the inlet 14. The food items 46 are loaded at the other end of the leading chute, e.g. via a hopper, and slide down the loading chute onto the conveyor belt at the inlet end 14. Alternatively, a sub-conveyor 80 (as shown in FIGS. 1, 3 and 4) may be used.

The sub-conveyor 80 comprises a sub-conveyor belt 82 which passes around a pair of end rollers 84 and 86. The sub-conveyor 80 further comprises a guide roller 88. The end rollers 84 and 86 and the guide roller 88 are rotatably held between two side plates 90.

A loading hopper 92 may be positioned above the sub-conveyor belt 82.

A toothed wheel 94 is provided on a roller 96. The toothed wheel 94 is able to mesh with the toothed wheel 76 so that drive is transferred from the toothed wheel 76 to the toothed wheel 96. In this way the sub conveyor belt 82 is caused to move in the direction shown by arrow S in FIG. 3. This meshing is best seen in FIG. 4.

FIG. 4 shows the discharge chute 42 and the sub-conveyor 80 in position, but is in other respects the same as FIG. 3, though further reference numerals have been omitted therefrom.

The manner of use and operation of cooking apparatus 10 will now be described.

The cooking fluid is brought to operating temperature by the reservoir or collector/heating arrangement 38 and once this has occurred the drive assembly 72 is activated to move the conveyor belt 52. Food items 46 can then be loaded at the inlet end 14 by way of the loading chute or the sub-conveyor 80. As the food items 46 move along the conveyor belt 52 they are cooked by the cooking fluid being sprayed from the nozzles 32 in the cooking chamber 18. The food items 46 are then discharged by the discharge chute 98 at the outlet end 16. The structure of the conveyor belt 52 permits the sprayed cooking fluid to pass therethrough. Excess cooking fluid lands at the sloped lower surface 30 of the housing 12 and runs therealong to the opening 44 and passes therethrough back into the reservoir or collector/heating arrangement 38 where it is filtered and re-heated and then recirculated through the pipes 34 to be sprayed once again from the nozzles 32.

In this way, the reservoir or collector/heating arrangement 38 is removed from the cooking chamber and covered by a filter arrangement 43. There is no accumulation of cooking fluid within the cooking chamber or in direct communication with the cooking chamber.

The tank 40 replenishes the supply of cooking fluid to the cooking apparatus 10, as necessary.

Positioning the conveyor 24 wholly within the housing 12 enables the cooking chamber 18 to be effectively sealed.

This can be done by way of the flaps 68 and 70. By sealing the cooking chamber 18 in this manner, it is possible to maintain a more effective temperature control of the cooking chamber 18 which results in more efficient cooking of the food items 46.

Further, the problems associated with oil drip are eliminated since the conveyor 24 is positioned wholly within the housing 12. Thus, there are no portions of the conveyor 24 protruding from the housing 12. The excess oil does not fall or drip from the conveyor 24 to the exterior of the housing 12 but is contained wholly within the housing 12. It runs along the sloped lower surface 30 and passes through the opening 44 into the reservoir or collector/heating arrangement 38. Thus, it is always contained within the housing 12 and does not soil the floor of the premises in which the cooking apparatus 10 is installed and as it is not exposed to the outside air oil temperature is better maintained.

The conveyor 24 of the present invention also is entirely removable as a unit from the cooking apparatus 10. This is achieved through the use of a male and female drive coupling 100 on the spindle of the end roller 54. This enables the conveyor 24 to be readily exchanged for another conveyor, e.g. a conveyor 24' (which is similarly removable), and also enables it to be readily removed for cleaning or maintenance. This removal further enables the entire interior surfaces of the cooking chamber 18 to be effectively cleaned and access is also possible to the lower nozzles 32. Modifications and variations such as would be apparent to a skilled addressee are deemed within the scope of the present invention.

What is claimed is:

1. A liquid spray cooking apparatus comprising:

a housing;

a cooking chamber located within said housing and having longitudinally spaced inlet and outlet ends;

a conveyor to convey food to be cooked through said cooking chamber, said conveyor being longitudinally disposed between said inlet and outlet ends, wherein the conveyor passes around end rollers revolving around a plurality of end spindles, and passes over and around successive pairs of guide rollers and tensioning rollers to create a number of dips in the path of the conveyor belt, and wherein the conveyor is driven from one of the end spindles and connected to a drive by a male and female coupling such that the conveyor can be easily disengaged from the drive mechanism;

loading means to load food into said cooking chamber without entrainment of said food in a liquid;

spray means to spray said food with a cooking liquid as said food passes through said cooking chamber to cook said food, the spray means being positioning both above and below the conveyor; and wherein said conveyor is positioned wholly within said housing.

* * * * *